(12) United States Patent
Shi et al.

(10) Patent No.: US 6,362,549 B1
(45) Date of Patent: Mar. 26, 2002

(54) MAGNETIC BEARING DEVICE

(75) Inventors: Yongwei Shi; Yoshinobu Otachi, both of Narashino (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/616,644

(22) Filed: Jul. 14, 2000

(30) Foreign Application Priority Data

Jul. 26, 1999 (JP) .......................................... 11-210960

(51) Int. Cl.[7] .................................................. A02K 7/09
(52) U.S. Cl. ......................................... 310/90.5; 310/90
(58) Field of Search ................... 310/90.5, 90; 415/364

(56) References Cited

U.S. PATENT DOCUMENTS 4,609,332 A * 9/1986 Miki et al. .................. 417/352
5,736,802 A * 4/1998 Ueyama et al. ............. 310/90.5
5,739,609 A * 4/1998 Ueyama et al. ............. 310/90.5
5,783,887 A * 7/1998 Ueyama et al. ............. 310/90.5

* cited by examiner

Primary Examiner—Nestor Ramirez
Assistant Examiner—Thanh Lam
(74) Attorney, Agent, or Firm—Adams & Wilks

(57) ABSTRACT

A magnetic bearing device has a rotational member mounted for undergoing rotation about a rotary axis, a permanent magnet disposed on the rotational member, and a motor for rotating the rotational member. The motor has a core, projecting portions extending from the core, and motor coils each wound around a respective one of the projecting portions. The motor is disposed opposite to and spaced-apart from the permanent magnet for rotating the rotational member and contactlessly controlling an axial position of the rotational member along the rotary axis only by a magnetic forces generated between the permanent magnet, the core and the motor coils. A magnetic radial bearing contactlessly controls a radial position of the rotational member.

16 Claims, 5 Drawing Sheets

MAGNETIC BEARING DEVICE

BACKGROUND OF THE INVENTION

1. Field of the Invention

The present invention relates generally to a magnetic bearing device and, more particularly, to a magnetic bearing device in which the need for detection of and control of the position of a rotational member in the axial direction is eliminated to reduce the number of component parts, and which, therefore, can be smaller in size and can have lower manufacturing cost and lower power consumption.

2. Description of the Related Art

FIG. 5 illustrates an example of a conventional magnetic bearing device 10 of a five axes control type. An upper radial electromagnet 1 in the arrangement shown in FIG. 5 is capable of adjusting the position in the radial direction (hereinafter referred to simply as "radial position") of an upper portion of an inner rotor 3 with an adjustment meter or the like (not shown) based on a radial position detected by an upper radial position detection sensor 2. On the other hand, a lower radial electromagnet 5 is capable of adjusting the radial position of a lower portion of the inner rotor 3 with an adjustment meter or the like (not shown) based on a radial position detected by a lower radial position detection sensor 6.

A motor 7 is provided between the upper radial electromagnet 1 and the lower radial electromagnet 5 to cause the inner rotor 3 to rotate at a high speed in a state of floating by magnetic force. A disk 9 is fixed to a portion of the inner rotor 3 below the lower radial position detection sensor 6. The disk 9 is attracted upward by an upper axial electromagnet 11a and is attracted downward by a lower axial electromagnet 11b.

An axial sensor 13 is provided in a lower portion of a cylindrical casing 15 so as to face the lower end of the inner rotor 3. The position in the axial direction (hereinafter referred to simply as "axial position") of the inner rotor 3 can be adjusted by balancing the attractions of the upper and lower axial electromagnets 11a and 11b with an adjustment meter or the like on the basis of the axial position detected by the axial sensor 13.

In the above-described conventional magnetic bearing device 10, however, the axial sensor 13, the upper axial electromagnet 11a and the lower axial electromagnet 11b are required for supporting the rotor at the predetermined axial position.

The number of component parts of the magnetic bearing device 10 is thereby increased, so that it is difficult to reduce the manufacturing cost and size of the magnetic bearing device. Moreover, since electric power is consumed by the upper and lower axial electromagnets 11a and 11b, there is a limit to reduction of the power consumption.

SUMMARY OF THE INVENTION

The present invention has been made in view of the above-described problems of the conventional art, an object of the present invention is to provide a magnetic bearing device in which the need for detection of and control of the position of a rotating member in the axial direction is eliminated to reduce the number of component parts, and which, therefore, can be smaller in size and can have lower manufacturing cost and lower power consumption.

To achieve the above-described object, according to the present invention, there is provided a magnetic bearing device comprising: a rotational member floated and supported by magnetic force; at least one permanent magnet arranged on the rotational member; magnetic means for rotating the rotational member by magnetic fields generated through a core on which motor coils are formed, and which is spaced apart from the permanent magnet in the radial direction so as to form a predetermined gap therebetween; at least one set of radial position detection means for detecting the radial position and/or the inclination of the rotational member; and at least one set of radial position adjustment means for adjusting the radial position and/or the inclination of the rotational member based on the radial position and/or the inclination of detected by the radial position detection means. According to the present invention, the rotational member is supported at the desired axial position by axial direction components of magnetic attractions generated between the permanent magnet and the core.

The rotational member rotates in a state of floating by magnetic force. The rotational member comprises an inner rotor and an outer rotor. The magnetic bearing device is assumed to comprise an electric motor and a generator capable of floating a rotational member by magnetic force. The rotational member is provided with at least one permanent magnet. The core on which the motor coils constituting the magnetic means are formed is spaced apart from the permanent magnet so as to form a predetermined gap therebetween. The rotational member is rotated by magnetic attraction forces generated between the permanent magnet and the magnetic means.

The radial position detection means detects the radial position and/or the inclination of the rotational member. The radial position adjustment means adjusts the radial position and/or the inclination of the rotational member based on the radial position and/or the inclination detected by the radial position detection means.

In the case of three axes control, a radial position control is formed by one set of radial position detection means and one set of radial position adjustment means. In the case of five axes control, a radial position control is formed by two sets of radial position detection means respectively provided in two places distanced apart from each other along the axial direction, and two sets of radial position adjustment means also provided in two places along the axial direction.

There is no particular limitation in the order in which the radial position detection means and the radial position adjustment means are arranged in the axial direction.

The rotational member is supported at the desired axial position by axial direction components of magnetic attractions generated between the permanent magnet and the core.

As described above, the need for detection of and control of the position of the rotational member in the axial direction can be eliminated. Accordingly, the number of component parts can be reduced, and the magnetic bearing device can be small in size and can have low manufacturing cost and low power consumption.

DETAILED DESCRIPTION OF THE PREFERRED EMBODIMENT

Figure 4:
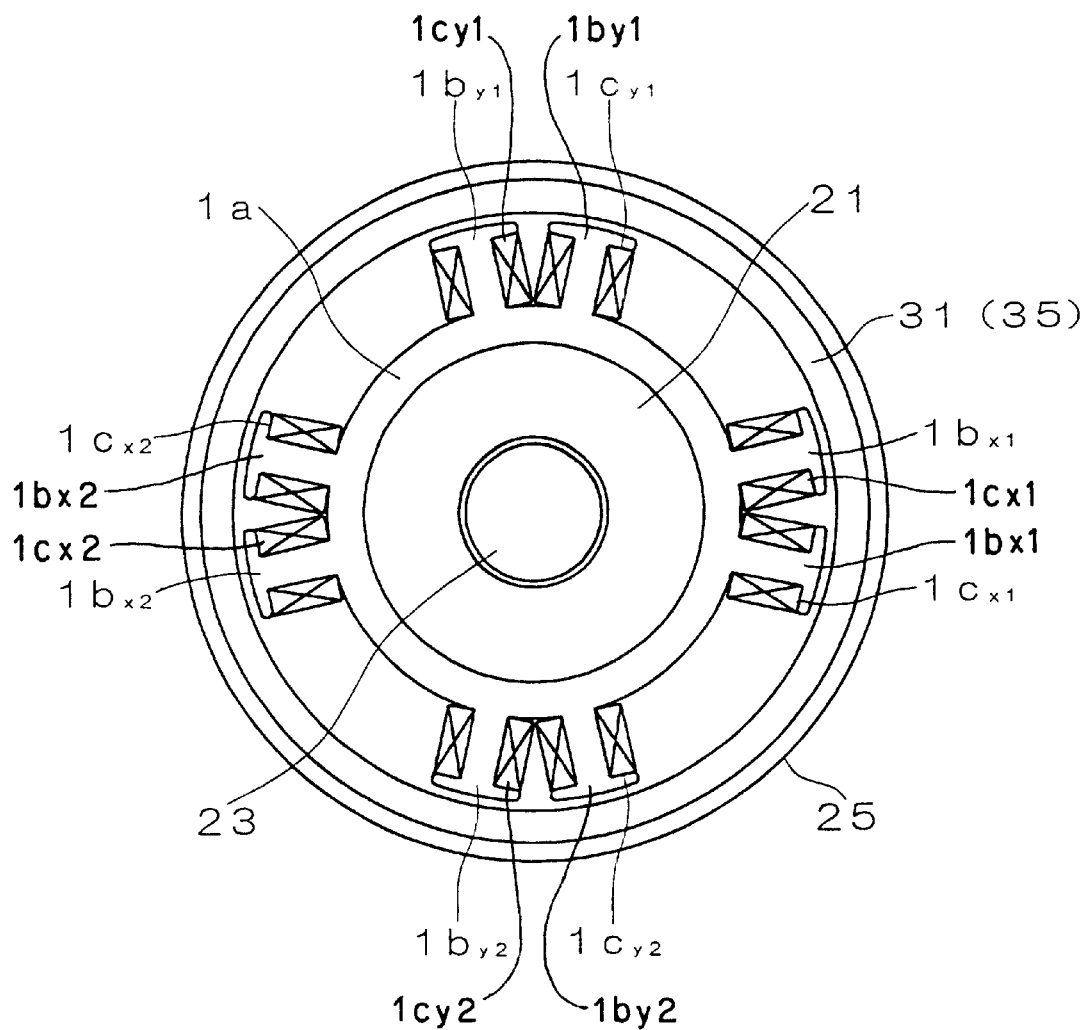
FIG. 4 is a cross-sectional view taken along the lines II—II and IV—IV of FIG. 1.
Figure 5:
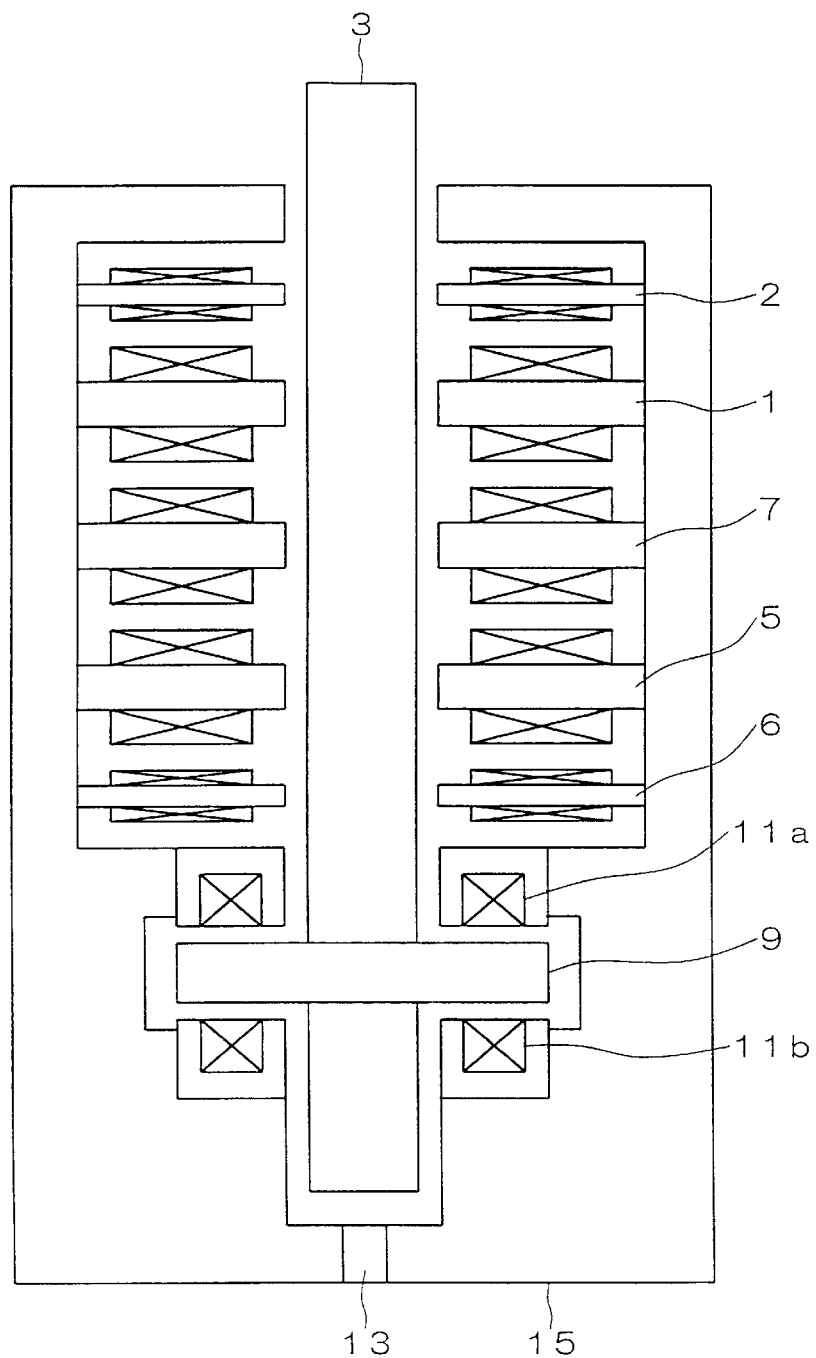
FIG. 5 is a diagram showing an example of a conventional magnetic bearing device of a five axes control type.

A preferred embodiment of the present invention will be described below with reference to FIGS. 1 through 4, in which components identical or corresponding to those shown in FIG. 5 are indicated by the same reference symbols. The description for the corresponding components will not be repeated.

Figure 1:
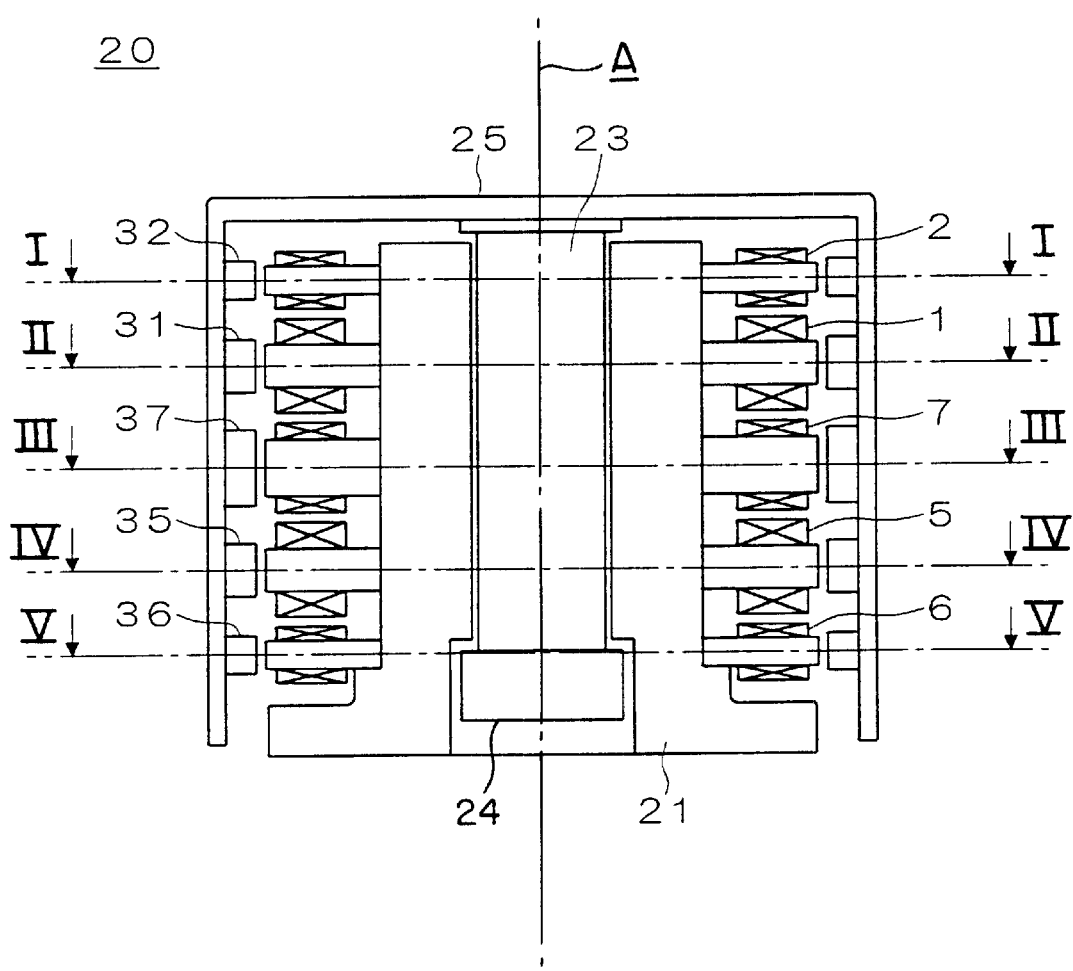
FIG. 1 is a longitudinal sectional view of a magnetic bearing device which represents an embodiment of the present invention.

Referring to FIG. 1, an upper radial position detection sensor 2, an upper radial electromagnet 1, a motor 7, a lower radial electromagnet 5 and a lower radial position detection sensor 6 are mounted in this order on the circumferential surface of a stator 21 from an uppermost position to a lowermost position thereon. A rotational member comprises a shaft 23 which is passed through a central portion of the stator 21. A stopper 24 is fixed to the lower end of the shaft 23, while an outer rotor 25 of the rotational member is fixed to the upper end of the shaft 23. The stopper 24 prevents the rotating member from coming off the stator 21.

The outer rotor 25 is a rotational member having a hollow cylindrical shape such as to cover the upper radial position detection sensor 2, the upper radial electromagnet 1, the motor 7, the lower radial electromagnet 5, and the lower radial position detection sensor 6.

Figure 2:
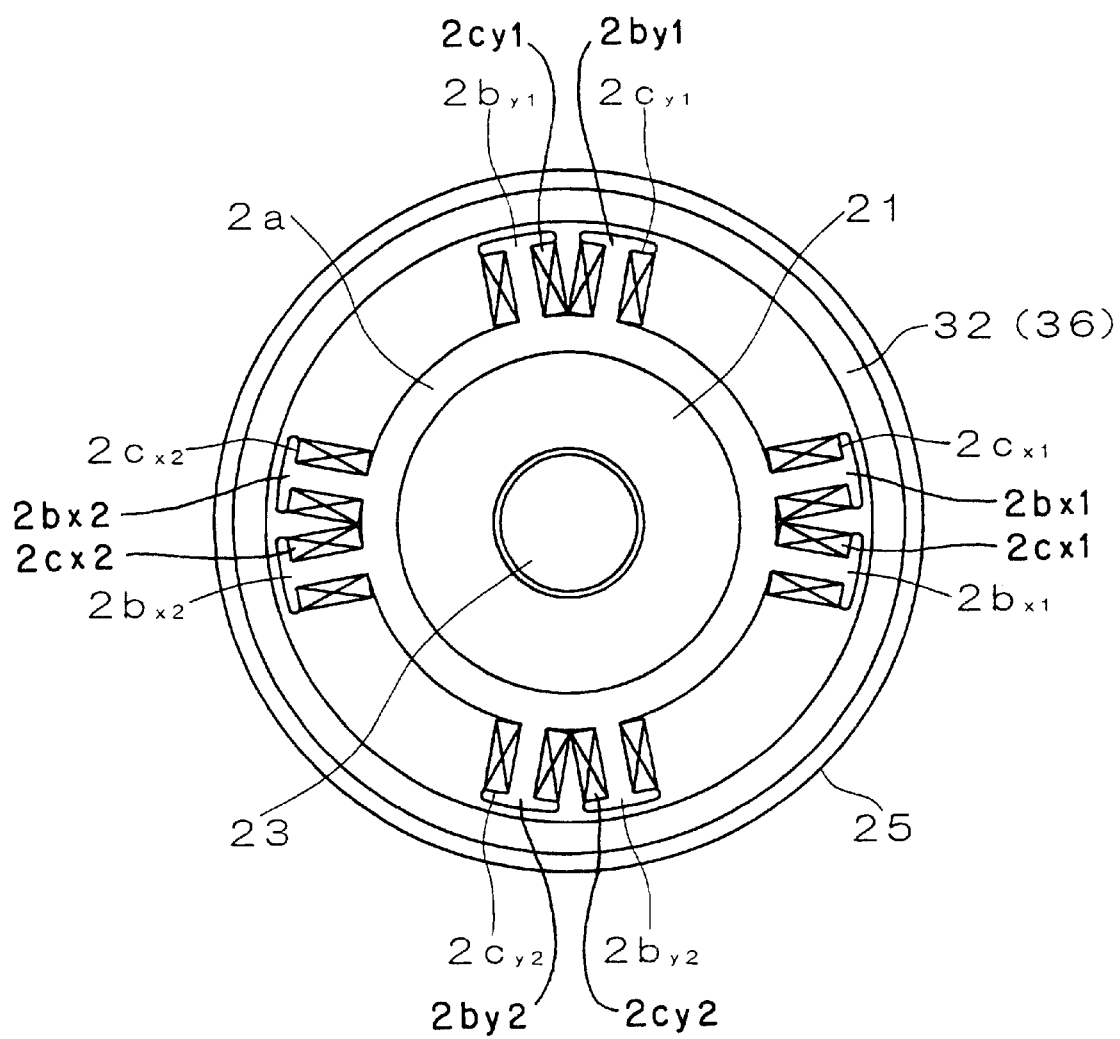
FIG. 2 is a cross-sectional view taken along the lines I—I and V—V of FIG. 1.

The upper radial position detection sensor 2 (having the same construction as the lower radial position detection sensor 6) is formed by winding radial position detection coils $2c$ around projecting portions $2b$ extending from an iron core $2a$, as shown in FIG. 2. The projecting portions $2b$ and the radial position detection coils $2c$ are formed in four circularly-distributed places such as to form magnetic pole pairs in X- and Y-directions.

That is, the projecting portions $2bx1$ and the radial position detection coils $2cx1$ are provided in the X-axis plus direction; the projecting portions $2bx2$ and the radial position detection coils $2cx2$, in the X-axis minus direction; the projecting portions $2by1$ and the radial position detection coils $2cy1$, in the Y-axis plus direction; and the projecting portions $2by2$ and the radial position detection coils $2cy2$, in the Y-axis minus direction.

Also, the upper radial electromagnet 1 (having the same construction as the lower radial electromagnet 5) is formed by winding radial position adjustment coils $1c$ around projecting portions $1b$ extending from an iron core $1a$, as shown in FIG. 4. The projecting portions $1b$ and the radial position adjustment coils $1c$ are formed in four circularly-distributed places such as to form magnetic pole pairs in X- and Y-directions, respectively.

That is, the projecting portions $1bx1$ and the radial position adjustment coils $1cx1$ are provided in the X-axis plus direction; the projecting portions $1bx2$ and the radial position adjustment coils $1cx2$, in the X-axis minus direction; the projecting portions $1by1$ and the radial position adjustment coils $1cy1$, in the Y-axis plus direction; and the projecting portions $1by2$ and the radial position adjustment coils $1cy2$, in the Y-axis minus direction.

The radial position detecting coils $2c$ of the upper radial position detection sensor 2, and the radial position adjustment coils $1c$ of the upper radial electromagnet 1 are provided in the same directions.

Figure 3:
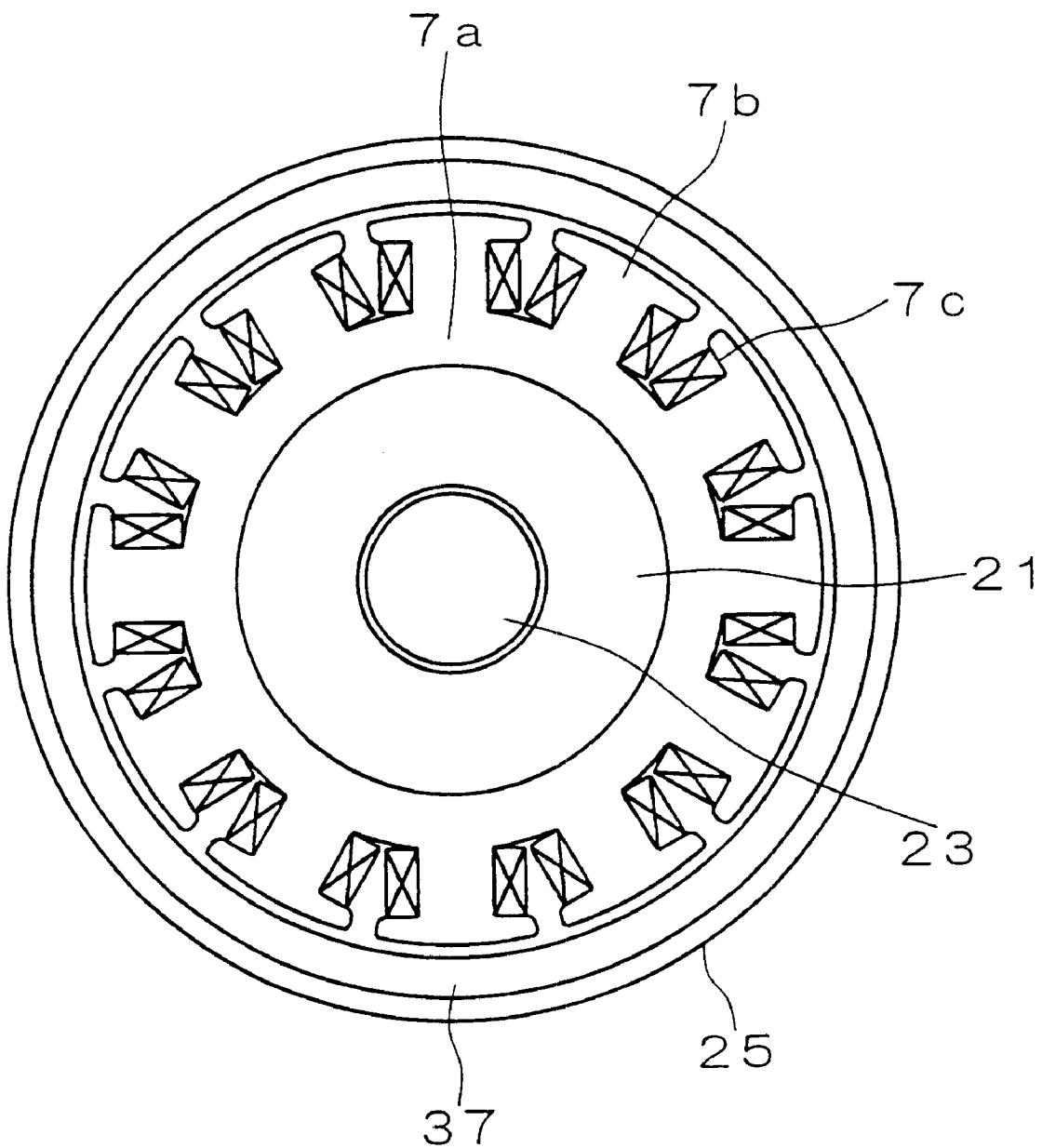
FIG. 3 is a cross-sectional view taken along the line III—III of FIG. 1.

The motor 7 is formed by winding motor coils $7c$ around projecting portions $7b$ extending from an iron core $7a$, as shown in FIG. 3. The core of the motor 7 is formed by the iron core $7a$ and the projecting portions $7b$. The projecting portions $7b$ and the motor coils $7c$ are formed in twelve places circularly arranged at regular intervals.

On the inner surface of the outer rotor 25, an upper radial position detection target 32 is fixed circularly while being positioned so as to face the projecting portions $2b$ of the upper radial position detection sensor 2. Similarly, a lower radial position detection target 36, an upper radial position adjustment target 31, and a lower radial position adjustment target 35 are fixed on the inner surface of the rotor 25 while being positioned so as to face projecting portions $6b$ of the lower radial position detection sensor 6, the projecting portions $1b$ of the upper radial electromagnet 1, and projecting portions $5b$ of the lower radial electromagnet 5, respectively.

Each of the upper radial position detection target 32, the lower radial position detection target 36, the upper radial position adjustment target 31, and the lower radial position adjustment target 35 is formed a laminated piece of steel.

A motor permanent magnet 37 is fixed on the inner surface of the rotor 25 while being positioned so as to face the projecting portions $7b$ of the motor 7. The motor permanent magnet 37 is magnetized so as to have a predetermined number of magnetic poles.

The operation of the embodiment of the present invention will now be described.

An X-direction displacement of an upper portion of the outer rotor 25 is detected with the radial position detection coils $2cx1$ and $2cx2$, and an X-direction displacement of a lower portion of the outer rotor 25 is detected with the radial position detection coils $6cx1$ and $6cx2$. This detection is performed based on a change in the inductance between each sensor and the outer rotor 25.

Also, a Y-direction displacement of the upper portion of the outer rotor 25 is detected with the radial position detection coils $2cy1$ and $2cy2$, and a Y-direction displacement of the lower portion of the outer rotor 25 is detected with the radial position detection coils $6cy1$ and $6cy2$.

The radial position adjustment coils $1cx1$ and $1cx2$ are excited through an adjustment meter or the like (not shown) on the basis of the detected X-direction displacements, while the radial position adjustment coils $1cy1$ and $1cy2$ are excited through an adjustment meter or the like (not shown) on the basis of the detected Y-direction displacements. The excited coils attract the outer rotor 25 to adjust the radial position of the upper portion of the outer rotor 25. The radial position adjustment of the lower portion of the outer rotor 25 is also performed in the same manner.

The motor permanent magnet 37 and the motor coils $7c$ drive and rotate the outer rotor 25 by the magnetic attractions generated between them, and also support the outer rotor 25 in the predetermined position in the axial direction by their magnetic attractions. This support is also effected when the outer rotor 25 is in a stationary state.

In the above-described arrangement, there is no need for additional means for supporting the axial position of the outer rotor 25 at the predetermined position, such as required for the conventional magnetic bearing device shown in FIG. 5, i.e., the axial sensor 13, the upper axial electromagnet $11a$, the lower axial electromagnet $11b$, and the targets facing these components.

Therefore, the manufacturing cost and the size of the magnetic bearing device 20 can be reduced by reducing the number of component parts, as described above. Further, since the axial sensor 13, the upper axial electromagnet $11a$ and the lower axial electromagnet $11b$ which are required for the conventional magnetic bearing device shown in FIG. 5 are not necessary in the magnetic bearing device of the present invention, electric power can be correspondingly saved.

In the bearingless motor, the magnetic forces generated by the motor coils $7c$ are unbalanced by the magnetic forces generated by the radial position adjustment coils 1c or the radial position adjustment coils 5c to magnetically adjust the radial position while producing a rotating force.

The present invention can also be applied to a magnetic bearing device using an integral bearingless motor constructed in such a manner that the motor coils 7c and radial position adjustment coils 1c or the radial position adjustment coils 5c are formed on one iron core. Also in such a case, the axial sensor 13 and other components can be eliminated.

According to the present invention, as described above, the rotational member is supported at the desired axial position by axial direction components of magnetic attractions generated between the permanent magnet and the magnetic thereby eliminating the need for detection of and control of the position of the rotational member in the axial direction. Consequently, the number of component parts can be reduced.

What is claimed is:

1. A magnetic bearing device comprising:
a rotational member mounted for undergoing rotation about a rotary axis;
at least one set of radial position detection means for detecting a radial position and/or an inclination of the rotational member in a radial direction;
at least one set of radial position adjustment means for adjusting the radial position and/or the inclination of the rotational member in accordance with the radial position and/or the inclination detected by the radial position detection means;
at least one permanent magnet disposed on the rotational member; and
magnetic means disposed opposite to and spaced-apart from the permanent magnet in the radial direction for generating a magnetic field for rotating the rotational member and supporting the rotational member in an axial position along the rotary axis.

2. A magnetic bearing device according to claim 1; wherein the magnetic means includes means for supporting the rotational member in the axial position by axial direction components of magnetic attraction forces generated between the magnetic means and the permanent magnet.

3. A magnetic bearing device according to claim 1; wherein the magnetic means comprises a motor having a core, a plurality of projecting portions extending from the core, and a plurality of coils each wound around a respective one of the projecting portions.

4. A magnetic bearing device according to claim 1; wherein the rotational member comprises a shaft and a rotor connected to the shaft for rotation therewith; and wherein the permanent magnet is connected to an inner surface of the rotor.

5. A magnetic bearing device comprising: a rotational member mounted for undergoing rotation about a rotary axis; a permanent magnet disposed on the rotational member; magnetic radial bearing means for contactlessly controlling a radial position of the rotational member; and magnetic means disposed opposite to and spaced-apart from the permanent magnet for generating a magnetic force that coacts with the permanent magnet for rotating the rotational member and contactlessly controlling an axial position of the rotational member along the rotary axis.

6. A magnetic bearing device according to claim 5; wherein the magnetic means comprises a motor having a core, a plurality of projecting portions extending from the core, and a plurality of coils each wound around a respective one of the projecting portions.

7. A magnetic bearing device according to claim 5; wherein the magnetic means includes means for generating a magnetic force for magnetically attracting the permanent magnet to the magnetic means.

8. A magnetic bearing device according to claim 5; further comprising a stator; and wherein the magnetic radial bearing means is disposed along the length of the stator.

9. A magnetic bearing device according to claim 8; wherein the magnetic radial bearing means comprises at least one set of radial position detection sensors for detecting a radial position and/or an inclination of the rotational member, and at least one set of radial electromagnets for adjusting the radial position and/or the inclination of the rotational member in accordance with the radial position and/or the inclination detected by the radial position detection sensors.

10. A magnetic bearing device comprising: a rotational member mounted for undergoing rotation about a rotary axis; a permanent magnet disposed on the rotational member; a motor having a core, a plurality of projecting portions extending from the core, and a plurality of motor coils each wound around a respective one of the projecting portions, the motor being disposed opposite to and spaced-apart from the permanent magnet for rotating the rotational member and contactlessly controlling an axial position of the rotational member along the rotary axis only by a magnetic force generated between the permanent magnet, the core and the motor coils; and a magnetic radial bearing for contactlessly controlling a radial position of the rotational member.

11. A magnetic bearing device according to claim 10; wherein the axial position of the rotational member is controlled by axial direction components of the magnetic force generated between the permanent magnet, the core and the motor coils.

12. A magnetic bearing device according to claim 10; wherein the core of the motor generates a magnetic force for magnetically attracting the permanent magnet to the core.

13. A magnetic bearing device according to claim 10; wherein the magnetic radial bearing comprises at least one set of radial position detection sensors for detecting a radial position and/or an inclination of the rotational member, and at least one set of radial electromagnets for adjusting the radial position and/or the inclination of the rotational member in accordance with the radial position and/or the inclination detected by the radial position detection sensors.

14. A magnetic bearing device according to claim 13; further comprising a stator; and wherein the radial position detection sensors and the radial electromagnets are disposed along the length of the stator.

15. A magnetic bearing device according to claim 14; wherein the stator has a generally central opening; and wherein the rotational member comprises a shaft extending through the central opening of the stator.

16. A magnetic bearing device according to claim 15; wherein the rotational member further comprises a rotor connected to a first end of the shaft for rotation therewith; and further comprising stopper disposed at a second end of the shaft opposite the first end thereof for limiting displacement of the shaft along the rotary axis and in the direction of the first end.

* * * * *